July 11, 1933.  B. DEWEY  1,917,755
METHOD OF MAKING RUBBER FIBER ARTICLES
Filed Aug. 6, 1932
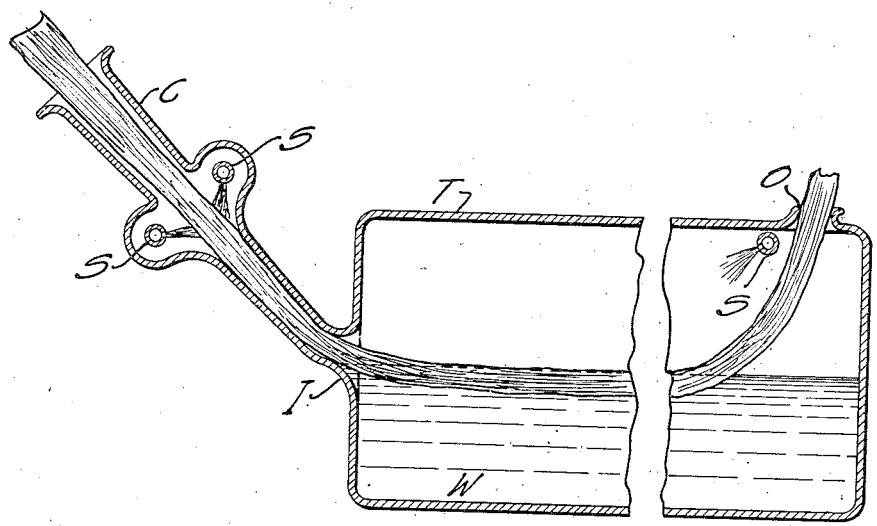
Inventor
Bradley Dewey
by Roberts, Cushman & Woodberry,
Attys Patented July 11, 1933

1,917,755

UNITED STATES PATENT OFFICE

BRADLEY DEWEY, OF CAMBRIDGE, MASSACHUSETTS, ASSIGNOR TO DEWEY AND ALMY CHEMICAL COMPANY, OF CAMBRIDGE, MASSACHUSETTS, A CORPORATION OF MASSACHUSETTS

METHOD OF MAKING RUBBER-FIBER ARTICLES

Application filed August 6, 1932, Serial No. 627,737, and in Great Britain May 30, 1931.

This invention relates to the production of miscellaneous articles composed of fibers associated intimately with rubber coherently coagulated in situ from an aqueous dispersion thereof and is a continuation in part of my application Serial Number 344,145, filed March 5, 1929. Objects of the invention are to render the mutual association of rubber and fiber more rapid, more uniform, and more certainly controllable than has been the case heretofore.

For example, United States Patent No. 1,671,914, dated May 29, 1928, to William Burton Wescott, describes a process of making fiber-reinforced rubber articles which, while practically operative and commercially used, involves several disadvantageous features which it is my object to eliminate. The employment of an active coagulant to coagulate latex rubber in a fibrous structure saturated with latex initially sets a close-textured though reticulate skin of coagulated rubber at the surfaces of the structure, which restrains, retards, and even prevents a complete and uniform dissemination of the coagulant throughout the latex-impregnated fibrous mass; and the slow diffusion of the coagulant through the outer skin which initially forms results in a further thickening and condensation of coagulated rubber locally and toward the surface, i. e., the rubber particles of the latex diffuse outwardly from the interior to meet the slowly incoming wave of coagulant and are coagulated in situ thereby, which practically prevents thorough penetration of the coagulant to and accompanying coagulation at the interior. But even a greater disadvantage arises from the fact that the conglomerate mass of fiber and rubber thus produced is so water-impervious that washing to free it from soluble salts is practically impossible and subsequent drying is extremely difficult.

My invention is characterized by the preparation of a composition of latex and a substance dispersible therein which comprises or contains a coagulant inactive, or dormant, under the physical conditions imposed on the composition during preparation thereof and also during the step of impregnation of a fibrous structure therewith, be the impregnation complete or partial, and by the subsequent alteration of these physical conditions from those which preclude coagulant activity of the dormant coagulant to those which render the coagulant active. More specifically, my invention is characterized by the preparation of a composition of latex and a substance dispersible therein which comprises or contains a coagulant inactive, or dormant, at relatively low temperature, e. g. room temperature, but which becomes active at a higher temperature, e. g. 150° F. to 212° F., giving a product characterized by an open texture and permeable structure, as well as remarkable uniformity and homogeneity.

The literature relating to latex and its treatment furnishes quite numerous examples of latex coagulants which are inert or dormant in the presence of coagulation buffers, with which, therefore, mixtures with latex can be made which remain stable without coagulation; others which though dispersed in latex remain inactive so long as the alkalinity of the emulsion is unaltered but operate as coagulants when—as by evaporation of ammonia from the emulsion—the alkalinity falls below a critical value; and others which are dormant at relatively low temperatures but become fully active when a higher temperature is reached. In some cases the coagulative ingredient is ever present, but its influence is suppressed and subdued by the imposed physical conditions; while in other cases no coagulative agent exists until there occurs an alteration in the imposed physical conditions which incites a chemical change productive within the mass of a new material coagulative of latex.

For the purposes of this specification and the claims attached to it, I use the term "dormant coagulant" as definitive of any substance or compound (physical or chemical) which, miscible and dispersible in latex emulsion is inactive therein under imposed physical conditions, but becomes active to coagulate the latex rubber when the coagulation-precluding condition is supplanted by another physical condition under which the coagulant, previously dormant, becomes active. By the term "inactive therein" I intend to embrace, as more fully hereinafter described, those materials which at ordinary workroom temperature do not convert the latex to a mass flowing less readily, or act as what is known in the art as thickening agents, but are, as the words imply, without appreciable effect upon the latex. I have discovered that all dormant coagulant latex compounds in which the state of subdivision of the colloidal rubber particles remains substantially the same as it was in the untreated latex, i. e., substantially unaggregated or unthickened as exemplified in my preferred example given below, are effective for use in all applications of my invention.

In the present specification and claims it is necessary sharply to differentiate between dormant coagulant latex compounds which aggregate to form only cheesy or caseous coagula when the necessary physical stimuli are supplied, and those which coagulate to a coherent continuum. Materials of the former class are not operative for the purposes of the present invention and the phrase "becomes active to coagulate the latex rubber" denotes only those materials which under the conditions of use result in a coherent unified rubber mass when the stimuli which incite the dormant coagulant to activity are applied. This distinction is necessary because many of the "dormant coagulants" as described and as used in the prior art are productive of the caseous type of coagula, but not the coherent reticulate type of coagulum here required, and furthermore because the term "coagulation" is often used to embrace any irreversible coalescence of the latex particles, be it to discrete aggregates or to the true coherent reticulate coagulum. Thus, for example, the latter materials may be sometimes advantageously used and have been employed in the preparation of dipped articles and coated fabrics where the syneresis or shrinkage of a coherent reticulate coagulum is often objectionable and where such shrinkage may be avoided by the production of the caseous type of coagulation, of which the resulting discrete particles become unified only on drying. The suitability in this respect of a dormant coagulant latex compound to the purposes of the present invention may be determined by subjecting a small quantity of the material to be tested per se to the physical influences which induce activation thereof and observing the resulting type of coagulation. If the particles merely aggregate to form a flocculent, cheesy, or caseous non-coherent fluid mass, the material is not suited; but if a coherent, unified rubber coagulum is formed, the dormant coagulant latex compound may be employed for the purposes of the present invention.

Miscroscopic observation of the inception of caseous coagulation discloses the formation of aggregates of varying sizes characterized by dense packing of the latex particles within the aggregate; while a coherent coagulum results from the arrangement of the latex particles in thread-like processes which unite to form an open-textured reticulate continuum. In the case of caseous coagula, the latex particles coalesce to form discrete flocks or aggregates which remain more or less dispersedly suspended in the continuous watery phase; whereas in the case of coherent coagula, the particles form a continuous coherent network permeated by the watery phase. It is the formation of this coherent structure to which the present invention is limited and to which I restrict the meaning of the word "coagulate."

Doubtless the most easily regulated determinant physical condition is temperature. I select as the dormant coagulant one which, provided alkalinity or other suitable protective condition be provided, is inactive at ordinary or easily imposed temperatures, but which at easily obtainable higher temperatures becomes active. Salts which provide bi- or tri-valent metal ions may constitute such dormant coagulants of which the behavior is determinable by temperature, being substantially inert while a mixture of latex and the sol or solution of salts is relatively cool, and becoming active when the temperature is raised to or above a critical value. For example, 0.15% (on a 30% latex) of a water-soluble calcium salt may form with normal alkaline latex a relatively stable mixture at ordinary room temperatures, but coagulates the latex at about 200° F. While dormant coagulant latex compounds of the bi- or tri-valent metal salt type may be employed, however, their use is not generally recommended because it is difficult to control and maintain their characteristics within the necessary narrow limits. Unless certain precautions are taken, bi- or tri-valent metal ions tend to thicken latex compounds by inducing incipient aggregation of the latex particles, thereby reducing their capability of penetrating small inter-fiber spaces and thus unfitting the material for the purposes of this invention. All commercial latex contains some small aggregates; but so long as the size of the aggregates in the latex compound, be they normally present or induced therein, is sufficiently small to permit their penetrating the interstices of the fibrous structure employed, their presence is not objectionable. The criterion of adaptability in this respect is whether or not the dormant coagulant latex compound is capable of penetrating and saturating the interstices of the fibrous structure which is to be treated. If the latter is relatively close-textured, such as a dense felt for example, a compound possessing the fluidity and penetrating characteristics of latex freed from its normally present "cream" may be required i. e., one which is substantially free from aggregated latex particles. If on the other hand, the fibrous material to be saturated is relatively open-textured, such as a loose long-fiber bat, the presence of minute aggregates may not be seriously objectionable. Aggregation of latex particles to the point of sensible thickening, whether it be a cream of normal latex or be induced by coagulative agents, renders the compound unsuitable for impregnation of fibrous structures. It is always advisable, therefore, to use compounds which are and will remain as free from aggregation as possible, because by so doing incompleted impregnation and consequent non-homogeneity of product are avoided.

As stated, bi- or tri-valent metal ions tend to cause incipient aggregation and an excess of these ions may completely aggregate the latex particles into caseous coagula. There are further disadvantages in the use of the salts of the bi- or tri-valent metals in that there are several variables to contend with in preparing therefrom dormant coagulant latex compounds suitable for the impregnation of fibrous structures. Thus the tendency to thicken latex, or aggregate the particles thereof, exhibited by the ions of these metals is accentuated by long standing, increases gradually with increase of temperature and depends in part on the stability of the latex. By selecting a latex of relatively high stability and ascertaining by experiment the minimum amount of metal ions requisite to produce a coherent coagulum at the activating temperature in that particular latex, the permissible storage time and temperature may be found by trial. Protective colloids capable of completely suppressing the tendency of bi- or tri-valent metal ions to thicken latex or incipiently aggregate its particles at normal temperature prevent, in general, the formation of a coherent coagulum at the activating temperature, and usually cause the ultimate coagulation to be of the caseous type. Certain heat-coagulable proteins, however, may be used which, while effectively preventing any substantial thickening of the latex compound under the influence of the bi- or tri-valent metal ions at normal temperatures, will themselves coagulate at or below the activating temperature of the dormant coagulant and thereupon cease to function as protectives. Upon the heat nullification of the protective effect of these coagulable proteins, the metal ions assert their full coagulative influence upon the unprotected latex particles and a coherent coagulum results. Among the heat-nullifiable protectives suitable for the purpose of this invention the following are mentioned in the order of their preference: hemoglobin, egg albumin, and serum albumin.

A composite of latex and dormant coagulant which I have found to be especially effective in carrying out my process and which I submit as a preferred example, is formed by adding to 300 parts of a normal alkaline latex (which contains about 30% of rubber and .8% of ammonia) 42 parts of a solution prepared by dissolving 10 parts of granulated zinc chloride in 160 parts of water and slowly adding thereto with stirring 15 parts of 28° Bé. commercial ammonia water.

This mixture of latex and dormant coagulant is remarkably stable at ordinary temperatures and up to about 110° F., the emulsion of rubber particles remaining unaffected, so that the composite will permeate and saturate permeable bodies as readily as latex alone. At or above 150° F., however, the previously dormant coagulant becomes active, and its coagulant effect is, at such temperatures, so rapid as to be practically instantaneous. The zinc of the preferred dormant coagulant latex compounds described above is present as a complex zinc ion $(Zn(NH_3)_4^{++})$ which is not coagulative of latex but which under the influence of heat undergoes dissociation with the liberation of free zinc cations which are strongly coagulative of latex. Cadmium salts also form with ammonia similar heat-dissociable complex ions and may be substituted for zinc chloride in the above cited example. Latex compounds prepared with their aid, however, are not so stable as those obtained by using zinc chloride or other soluble zinc salts which obviously may be employed with equally good results.

Any permeable fibrous structure (fleece, felt, bat, etc.) saturated with a composite such as above described, contains in its interfiber spaces, wherein the composite has penetrated, both the latex rubber of the emulsion and the coagulant which is ready to act whenever and wherever the physical condition (e. g. temperature) preclusive of coagulant activity is superseded by a physical condition, different in kind or degree (e. g. higher temperature) which renders the theretofore dormant coagulant active.

For further illustration of my process, reference may be had to the drawing which illustrates schematically in cross section portions of an apparatus which may be employed in carrying out certain processes in accordance with this invention. Having prepared a composite of latex and a dormant coagulant, such as the above specified ammoniated zinc chloride solution, a permeable fibrous structure, as for instance a felt or fleece, is impregnated with the said composite as by flowing the same upon the fibrous structure or immersing the fibrous structure in it. The thus impregnated fibrous sheet is drawn and conducted through a suitably formed conductor such as C which should so nearly fit the dimensions of the fibrous sheet as to prevent escape of the latex composite therefrom. During the impregnation and conveyance of the impregnated sheet to the device for producing initial coagulation, the conditions (as of temperature) which maintain the coagulant in its dormant state are maintained. It may be advisable initially to supersede the physical conditions which preclude activity of the dormant coagulant by conditions which operate to make this coagulant active at or near the surface of the fibrous body F. For instance, steam jet pipes S may be provided to spurt jets of hot steam on the two sides of the fibrous sheet. This steam raising the temperatures of the surfaces of the sheet to 150° F. or over activates the theretofore dormant coagulant and effects a coagulation of the latex rubber at and near the surfaces so that a thin film of coherently coagulated rubber extends over both surfaces and serves to retard and practically prevent any escape of the latex composite contained in the body of the fibrous sheet and also any penetration of water into the sheet during the next stage of operation, but does not, because of its extreme thinness, seriously impede the subsequent drying operation. The sheet then proceeds into a heating tank T through a suitable aperture at I where it comes in contatc with body of water W which is heated to a temperature high enough to activate the coagulant associated with the latex. The water also floats the impregnated fibrous sheet and thus relieves it of any stresses which might tend to distort or injure it. Preferably, also, the upper part of the covered tank T is filled with hot steam which issues from perforations in a steam-spraying pipe $S^1$, so that coagulant-activating temperature conditions are maintained above as well as below the impregnated sheet. The length of the tank T and the rate of progress of the fibrous sheet F are determined to the end that when the fibrous sheet is led from the tank through a suitable aperture as at O, the coagulant-activating temperature will have been imposed upon the latex composite and all parts thereof.

For still further illustration of a manner in which the fibrous material may be impregnated and the rubber coagulated, reference may be had to a detailed procedure which may be used for the manufacture of shoe soles. I proceed by saturating a thick, open-textured felt or bat in a bath of dormant coagulant latex compound prepared according to my preferred example given above. The wet material is subjected to light pressure, such as by pressing between open set squeeze rolls to remove the excess saturant. The impregnated material is then placed in a chamber filled with a mixture of steam and hot air so that a dry bulb temperature of about 150° C. and a wet bulb temperature of about 90° C. obtains. The temperature of the impregnated mass is rapidly raised and the rubber of the saturant coagulated to form a coherent reticulate structure. The relatively high humidity afforded by the steam greatly facilitates the conduction of heat into the material and minimizes an objectionable surface evaporation.

The composite impregnant of the fibrous structure carrying as it does both the latex rubber and the coagulant therefor, and this coagulant being almost instantaneously active as soon as the critical temperature is reached, the coagulation of the latex rubber will be uniform and rapid. In this respect it may be stated that the process of the present invention differs in physical principle from the before-mentioned Wescott process in that coherent coagulation throughout the mass results from conductance of heat instead of fluid coagulant thereinto; and this difference not only permits of much more rapid coagulation in the present instance, but also, as already stated, results in uniform rubber distribution free from the thick impervious outer skin which has tremendously impeded subsequent drying in otherwise similar processes practised in the prior art.

After the fibrous structure with its uniformly distributed content of coagulated rubber has emerged from the coagulating tank or heating chamber, the liquid remaining in the interstices or voids of the structure may be expressed, and the rubberized fibrous structure washed by alternate applications of clear water and expression thereof, and finally dried. Although the latter operation is preferably carried out in vacuum, it is quite practical to dry the product of this invention in an ordinary drying oven at atmospheric pressure. This is in sharp contra-distinction to the very expensive and cumbersome processes required by similar articles prepared in the prior art; and the extreme ease with which the excess moisture of the product of this invention may be removed by desiccation is most surprising and unexpected and constitutes one of the principal advantages thereof. After drying, the material may be compressed so as to eliminate the voids of the reticulum and to integrate all of the rubber into a substantially continuous and impermeable body reinforced by the including fibers. These subsequent manipulations are not illustrated by the drawing since they are the same in general character as those which have previously been applied to latex-impregnated fiber structures.

The addition and distribution in the latex composite of a vulcanizing agent will not at all interfere with the process above described and will, of course, prepare the latex rubber for vulcanization.

In these specifications and the claims which follow, except where otherwise particularly designated, I use the word "latex" as definitive and inclusive of water dispersions of rubber generally, whether artificially prepared as by emulsification of rubber previously coagulated or cured, or the normal latex which contains about 30% solids in the water dispersion of Revertex, in which the concentration of rubber is frequently as high as 1%

70%. The technique to be followed in carrying out the method herein described will vary with the latex employed. For instance, a Revertex, diluted if need be to facilitate impregnation of a fibrous structure, usually need not be alkaline to the degree necessary with normal latex in order to form stable compositions with dormant coagulants. The protective colloids incorporated in Revertex constitute buffers against coagulation, even if the Revertex be faintly alkaline or even neutral. In many cases these are beneficial in that they impart greater stability to the compound in the dormant state, but necessitate, nevertheless a higher concentration of potential coagulant than is demanded by ordinary latex; but in other cases and with certain dormant coagulants the supplementary protective constituents of the Revertex are detrimental since they cause coagulation of the objectionable caseous type.

I claim:

1. Method of depositing latex rubber in a close-textured permeable fibrous structure comprising (1) dispersing a dormant coagulant in latex under conditions to prevent thickening, (2) filling interfiber spaces of a close-textured permeable fibrous structure with the composite of latex and dormant coagulant, (3) activating the dormant coagulant in the latex throughout the body of said saturated fibrous structure to coagulate said latex to form throughout said structure a continuous coherent rubber network permeated by the watery phase, and (4) removing water therefrom.

2. Method of depositing latex rubber in a close-textured permeable fibrous structure comprising (1) dispersing a dormant coagulant in latex under conditions to prevent thickening, (2) filling interfiber spaces of a close-textured permeable fibrous structure with the composite of latex and dormant coagulant, (3) activating the dormant coagulant in the latex throughout the body of said saturated fibrous structure to coagulate said latex to form throughout said structure a continuous coherent rubber network permeated by the watery phase, and (4) removing water therefrom by drying.

3. Method of depositing latex rubber in a close-textured permeable fibrous structure comprising (1) dispersing a dormant coagulant in latex under conditions to prevent thickening, (2) filling interfiber spaces of a close-textured permeable fibrous structure with the composite of latex and dormant coagulant, (3) activating the dormant coagulant in the latex throughout the body of said saturated fibrous structure to coagulate said latex to form throughout said structure a continuous coherent rubber network permeated by the watery phase, and (4) removing water therefrom by expression and drying.

4. Method of depositing latex rubber in a close-textured permeable fibrous structure comprising (1) dispersing a heat-activable dormant coagulant in latex under conditions to prevent thickening, (2) filling interfiber spaces of a close-textured permeable fibrous structure with the composite of latex and dormant coagulant, (3) raising the temperature throughout the body of said saturated fibrous structure to activate the dormant coagulant in the latex to coagulate said latex to form throughout said structure a continuous coherent rubber network permeated by the watery phase, and (4) removing water therefrom.

5. Method of depositing latex rubber in a close-textured permeable fibrous structure comprising (1) dispersing a heat-activable dormant coagulant in latex under conditions to prevent thickening, (2) filling interfiber spaces of a close textured permeable fibrous structure with the composite of latex and dormant coagulant, (3) raising the temperature throughout the body of said saturated fibrous structure to activate the dormant coagulant in the latex to coagulate said latex to form throughout said structure a continuous coherent rubber network permeated by the watery phase, and (4) removing water therefrom by drying.

6. Method of depositing latex rubber in a close-textured permeable fibrous structure comprising (1) dispersing a heat-activable dormant coagulant in latex under conditions to prevent thickening, (2) filling interfiber spaces of a close-textured permeable fibrous structure with the composite of latex and dormant coagulant, (3) raising the temperature throughout the body of said saturated fibrous structure to activate the dormant coagulant in the latex to coagulate said latex to form throughout said structure a continuous coherent rubber network permeated by the watery phase, and (4) removing water therefrom by expression and drying.

7. Method of depositing latex rubber in a permeable fibrous structure comprising (1) dispersing ammoniated zinc chloride in latex, (2) filling interfiber spaces of a permeable fibrous structure with the composite of latex and ammoniated zinc chloride, (3) raising the temperature throughout the body of said saturated fibrous structure to activate the ammoniated zinc chloride in the latex to coagulate said latex to form throughout said structure a continuous coherent rubber network permeated by the watery phase, and (4) removing water therefrom.

8. Method of depositing latex rubber in a permeable fibrous structure comprising (1) dispersing ammoniated zinc chloride in latex, (2) filling interfiber spaces of a permeable fibrous structure with the composite of latex and ammoniated zinc chloride, (3) raising the temperature throughout the body of said saturated fibrous structure to activate the ammoniated zinc chloride in the latex to coagulate said latex to form throughout said structure a continuous coherent rubber network permeated by the watery phase, and (4) removing water therefrom by drying.

9. Method of depositing latex rubber in a permeable fibrous structure comprising (1) dispersing ammoniated zinc chloride in latex, (2) filling interfiber spaces of a permeable fibrous structure with the composite of latex and ammoniated zinc chloride, (3) raising the temperature throughout the body of said saturated fibrous structure to activate the ammoniated zinc chloride in the latex to coagulate said latex to form throughout said structure a continuous coherent rubber network permeated by the watery phase, and (4) removing water therefrom by expression and drying.

10. Method of depositing latex rubber in a close-textured permeable fibrous structure comprising (1) dispersing a bi-valent or tri-valent metal salt in latex in such quantity and under such conditions as to prevent thickening at lower temperatures but to cause coherent coagulation of the latex when the temperature is raised, (2) filling interfiber spaces of a close-textured permeable fibrous structure with the composite of latex and bi-valent or tri-valent metal salt, (3) raising the temperature throughout the body of said saturated fibrous structure to activate the bi-valent or tri-valent metal salt in the latex to coagulate said latex to form throughout said structure a continuous coherent rubber network permeated by the watery phase, and (4) removing water therefrom.

11. Method of depositing latex rubber in a close-textured permeable fibrous structure comprising (1) dispersing a bi-valent or tri-valent metal salt in latex in such quantity and under such conditions as to prevent thickening at lower temperatures but to cause coherent coagulation of the latex when the temperature is raised, (2) filling interfiber spaces of a close-textured permeable fibrous structure with the composite of latex and bi-valent or tri-valent metal salt, (3) raising the temperature throughout the body of said saturated fibrous structure to activate the bi-valent or tri-valent metal salt in the latex to coagulate said latex to form throughout said structure a continuous coherent rubber network permeated by the watery phase, and (4) removing water therefrom by drying.

12. Method of depositing latex rubber in a close-textured permeable fibrous structure comprising (1) dispersing a bi-valent or tri-valent metal salt in latex in such quantity and under such conditions as to prevent thickening at lower temperatures but to cause coherent coagulation of the latex when the temperature is raised, (2) filling interfiber spaces of a close-textured permeable fibrous structure with the composite of latex and bi-valent or tri-valent metal salt, (3) raising the temperature throughout the body of said saturated fibrous structure to activate the bi-valent or tri-valent metal salt in the latex to coagulate said latex to form throughout said structure a continuous coherent rubber network permeated by the watery phase, and (4) removing water therefrom by expression and drying.

13. Method of depositing latex rubber in a permeable fibrous structure comprising (1) dispersing a bi-valent or tri-valent metal salt in latex containing a heat-coagulable protective, (2) filling interfiber spaces of a permeable fibrous structure with the composite of latex, bi-valent or tri-valent metal salt, and heat-coagulable protective, (3) raising the temperature through the body of said saturated fibrous structure to coagulate the protective and activate the bi-valent or tri-valent metal salt in the latex to coagulate said latex to form throughout said structure a continuous coherent rubber network permeated by the watery phase, and (4) removing water therefrom.

14. Method of depositing latex rubber in a permeable fibrous structure comprising (1) dispersing a bi-valent or tri-valent metal salt in latex containing a heat-coagulable protective, (2) filling interfiber spaces of a permeable fibrous structure with the composite of latex, bi-valent or tri-valent metal salt, and heat-coagulable protective, (3) raising the temperature throughout the body of said saturated fibrous structure to coagulate the protective and activate the bi-valent or tri-valent metal salt in the latex to coagulate said latex to form throughout said structure a continuous coherent rubber network permeated by the watery phase, and (4) removing water therefrom by drying.

15. Method of depositing latex rubber in a permeable fibrous structure comprising (1) dispersing a bi-valent or tri-valent metal salt in latex containing a heat-coagulable protective, (2) filling interfiber spaces of a permeable fibrous structure with the composite of latex, bi-valent or tri-valent metal salt, and heat-coagulable protective, (3) raising the temperature throughout the body of said saturated fibrous structure to coagulate the protective and activate the bi-valent or tri-valent metal salt in the latex to coagulate said latex to form throughout said structure a continuous coherent rubber network permeated by the watery phase, and (4) removing water therefrom by expression and drying.

Signed by me at Cambridge, Massachusetts, this 4th day of August, 1932.

BRADLEY DEWEY.